United States Patent Office 3,060,785
Patented Oct. 30, 1962

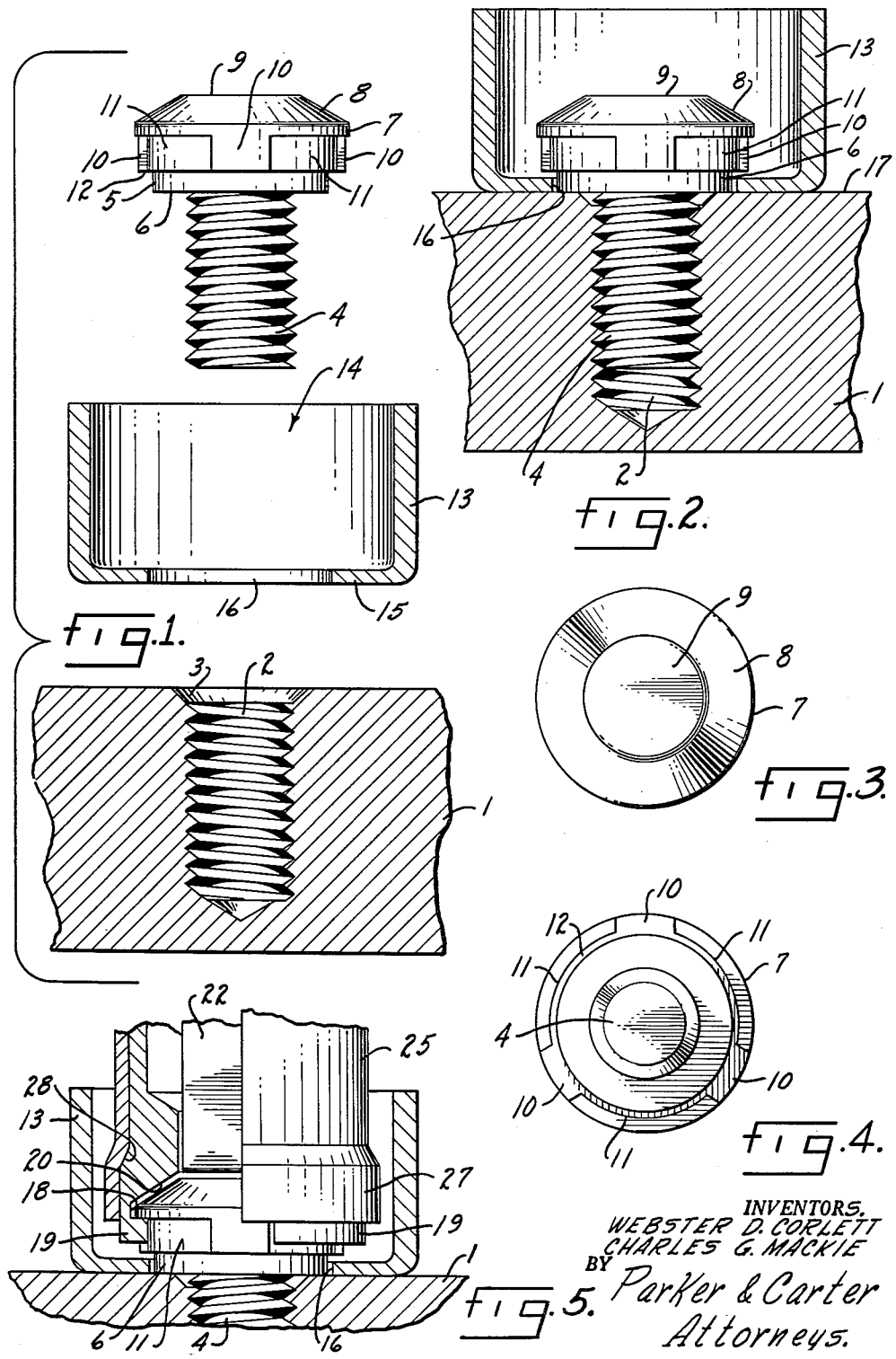

3,060,785
TAMPERPROOF BOLT HEAD HAVING HIDDEN TOOL ENGAGING SURFACES
Webster D. Corlett, River Forest, and Charles G. Mackie, Glen Ellyn, Ill., assignors to Standard Screw Company, Bellwood, Ill., a corporation of New Jersey
Original application June 30, 1959, Ser. No. 824,046, now Patent No. 3,034,386, dated May 15, 1962. Divided and this application July 11, 1960, Ser. No. 42,042
5 Claims. (Cl. 85—9)

This invention relates to a fastener and in the particular form here shown it is embodied in a tamperproof screw. The screw is designed so that it can only be removed by a particular tool, and hence cannot be removed by some unauthorized person. It is also, of course, intended only to be inserted by the tool. The fastener as a whole comprises a screw and an associated part, the purpose of the associated part being to conceal the precise nature of the screw and also to make the removal of the screw by some unauthorized tool impossible, or substantially so. An object of the invention, therefore, is to make a screw or fastener so arranged that it can be inserted only by a special tool and removed by that tool.

Another object is to provide a screw or fastener so arranged that the precise nature of the device is not ascertainable when it is in position.

Another object is to provide a fastener which, whether used in conjunction with a special close fitting collar or in a confined enclosure which provides in effect a collar, may not be removed by ordinary tools such as a screwdriver, drift pin, punch, hammer, etc., due to the inability of such tools to get a purchase on the fastener.

Other objects will appear from time to time during the course of the specification and claims.

The invention is illustrated more or less diagrammatically in the accompanying drawings wherein:

FIG. 1 is an exploded view showing the fastener, the protective and concealing member and a part containing a threaded perforation or bore into which the screw may be inserted;

FIG. 2 is a section showing the parts of FIG. 1 associated together in interfitting and holding position;

FIG. 3 is a top plan view of the fastener or screw itself;

FIG. 4 is a bottom plan view of the screw; and

FIG. 5 is a fragmentary section with parts broken away showing the tool in position engaging the fastener, the fastener being in fully "screwed home" position.

Like parts are indicated by like numerals throughout the specification and drawings.

As shown in FIGS. 1 and 2, the fastener is associated with a fastener receiving member 1 which might be a bolt or a structural member or any part of any shape so long as it is provided with a threaded perforation or bore 2. As shown the member 1 may be considered a plate or sheet or bar, or any other member in which it is desired to mount a tamperproof fastener. It may be of metal or wood. The invention is not limited to any particular material nor to a fastener which can be used in only a particular material. Although the screw is shown more or less as a machine screw, it could be in the form of a drive screw or other comparable fastener. In that case the thread would be quite different from the one shown.

Although not necessary, it is convenient to have the threaded bore 2 tapered or countersunk as at 3.

In the particular form shown the fastener includes the screw having a threaded shank 4 and an integral, laterally projecting portion 5 which provides, in effect, a shoulder 6. This shoulder is preferably of greater diameter than the threaded portion 4. A head 7 is provided integral with the shank 4 and the enlargement 6 and it is somewhat wider than the enlargement 6. It projects outwardly beyond it as shown in FIGS. 1, 2 and 3. The top of the head presents a substantially uninterrupted surface when viewed from above and thus, for example, may be tapered as at 8 and flattened or relatively flattened as at 9, taking thus the shape of a truncated cone. The head thus has what is sometimes referred to as a blind top. The undersurface of the head is provided, as shown in plan in FIG. 4, with a plurality of radially directed outward extensions 10 which normally extend flush with the outer edge of the head 7, as shown particularly in FIG. 4. In the particular form here shown there are three such extensions 10 and they are spaced equally about the periphery of the head of the screw. Between the extensions 10 there are depressions 11 and these are suitable to receive the points of the tool, shown in part in FIG. 5. Such a tool is shown in full in our copending application, Serial No. 824,046, filed June 30, 1959, and now Patent No. 3,034,386. It will be noticed, particularly as shown in FIG. 4, that the portion of the head in which the extensions 10 and depressions 11 are formed is somewhat wider than the member 6 and thus there is provided a shoulder or ledge 12 about the member 6 and above it which is in reality the bottom of that portion of the head which contains the members 11 and 12.

In addition to the fastener proper or screw, there is included in the total fastener combination an enclosure. This is formed by the round portion 13 which is open at its top as at 14 and is provided with a flat bottom 15 through which a perforation 16 is formed. The diameter of the perforation 16 is approximately that of the member 6 and when the parts are assembled together as shown in FIG. 2, all or a substantial portion of the portion 6 projects within the perforation 16 and lies against the upper surface 17 of the member 1 in which the fastener is received. The thickness of the bottom 15 may be varied if desired, but preferably it will be somewhat less than the height of the member 6 so that the fastener may be screwed tightly into position and will not be prevented from being so positioned by premature contact with the upper surface of the bottom 15.

The interfitting of the portion 6 and the perforation 16 results in holding the surrounding member 13 centrally with respect to the screw, and when the parts are assembled and the screw is fully engaged with the thread the parts will be centered fully as shown in FIG. 2 and thus an annular space of substantially equal width throughout its periphery remains between the outer edge of the head 7 and the inner face of the member 13 so that the tool may be readily inserted within the member 13 and engaged with the head in any position of relative rotation so that the prongs or points of the tool will fit into the depressions 11 and beneath the edge of the head 7 and when turned will contact the extensions 10 so that rotation of the screw into and out of position may be carried out. Once the screw is fully engaged, as shown in FIG. 2, it is completely surrounded by the member 13; the sides of the screw cannot be examined and an unauthorized person cannot determine what the shape beneath the head of the screw is for the purpose of attempting to use an unauthorized tool or some makeshift to remove the fastener. Thus, by the shape of the screw itself and its combination with the surrounding cuplike member a truly tamperproof fastener is produced.

As shown in FIG. 5 the parts of the fastener and the member 1 into which the fastener penetrates are the same as those shown in FIGS. 1 and 2, for example. A portion of a tool suitable for use in inserting and removing the fastener also appears. The tool comprises a plurality of jaw members or spring arms which are notched or grooved adjacent their lower ends at 18 to provide a shoulder member 19. The lower face of each spring member above the groove or notch 18 is beveled as at 20. As shown in FIG. 5, the shoulders 19 fit into the depressions 11 of the screw and may engage the underface of the screw edge portion as shown. Relative rotation of the screw and tool is prevented by the fact that the shoulder portions or ends 19 of the spring arms as they lie within the depressions 11 are prevented from having any substantial relative rotation by the extensions or projections 10. Thus the shape of the screw permits suitable interfitting of the spring arms with the head of the screw so that rotation of the tool, of which the spring arms form a part, causes rotation of the screw or fastener.

A plug member 22 is permanently positioned within the spring arms and they are shaped to interfit. The cross-sectional shape of the plug member is immaterial so long as it is shaped to cooperate with the inner faces of the spring arms to prevent relative rotation of these parts. The plug supports the spring arms when they are in the position shown in FIG. 5 and prevents distortion of them.

A member 25 is provided slidably along the fingers and along the tool of which they form extensions. The tool is so shaped that when the member 25 is raised away from the position of FIG. 5 the springs are free to move outwardly and the tool may thus be disengaged from the screw. However, when the tool is engaged with the screw and it is desired to fasten the two together so that the screw may be rotated by the tool, the member 25 slides into the position shown in FIG. 5 and when it is in this position the fingers are held with their shoulder portions 19 in the position shown in FIG. 5, gripping the screw. The slidable sleeve 25 is preferably flared outwardly to provide a skirtlike portion 27 adjacent its lower end. The contour of the skirt portion 27 is provided internally with a surface 28 to cooperate with the correspondingly beveled surface on the exterior of the spring arms or fingers. These two beveled surfaces cooperate when the sleeve 25 is in the lowered position of FIG. 5 to force the fingers inwardly into engagement with the screw. Only so much of the tool is shown and described as to indicate its method of use, since the tool is fully shown and claimed in our copending application, Serial No. 824,046, filed June 30, 1959, of which application the present application is a division.

Although an operative form of the device has been shown, the invention is not limited to the particular details shown. Many changes may be made in the form, shape and arrangement of parts without departing from the spirit of the invention.

We claim:

1. A removable tamperproof fastener in combination with an enclosure encompassing the periphery and extending above the top of the fastener, said enclosure closely surrounding the outermost periphery of the fastener and being of a size sufficient to receive a fastener tool,
    said fastener including a shank having means thereon for removably securing said fastener to a fastener receiving member by rotation,
    a peripherally uninterrupted head having a generally circular side edge and a blind top,
    the top surface of said head being relatively smooth and uninterrupted by projections or depressions, and
    at least one projecting member extending circumferentially of the head and radially outwardly from the axis of the fastener,
    said projecting member extending downwardly from the underside of said head, the lowermost periphery of said projecting member lying radially outwardly from the axis of the fastener a greater distance than the radial extent of the shank,
    said projecting member terminating in an abrupt shoulder facing downwardly and disposed at a substantial radial distance outwardly from the axis of the shank,
    the projecting member having surfaces so formed as to receive a tool,
    said projecting member lying completely within the periphery of the radial extent of the head.

2. The removable tamperproof fastener of claim 1 further including a stop member between the head and the shank, said stop member having a diameter less than the head and greater than the shank to thereby stop and space the head away from a fastener receiving member.

3. The removable tamperproof fastener of claim 2 further characterized in that the stop member is formed integrally with the head and shank.

4. The removable tamperproof fastener of claim 2 further including a removable protective and concealing member which limits visual and physical access to that portion of the fastener beneath the exposed top thereof,
    said protective and concealing member having a base wall with a generally centrally located aperture therein, the periphery of the aperture being larger than the periphery of the stop and smaller than the periphery of the head,
    said stop being slightly thicker than that portion of the base wall underlying the head, and
    a side wall extending generally upwardly from the base wall a distance sufficient to substantially conceal the underside of the head from vision,
    said side wall being spaced from the head a distance sufficient to permit insertion of a tool engageable with the head.

5. The removable tamperproof fastener of claim 4 further characterized in that the thickness of the stop member is less than the thickness of the bottom wall of said concealing member.

References Cited in the file of this patent
UNITED STATES PATENTS

| | | |
|---|---|---|
| 405,681 | Rogers | June 18, 1889 |
| 641,191 | Champion | Jan. 9, 1900 |
| 1,447,564 | Norlund et al. | Mar. 6, 1923 |
| 1,733,355 | Morse | Oct. 29, 1929 |
| 2,103,944 | Gullborg | Dec. 28, 1937 |
| 2,133,465 | Purtell | Oct. 18, 1938 |